(12) United States Patent
Zhang et al.

(10) Patent No.: US 10,670,457 B2
(45) Date of Patent: Jun. 2, 2020

(54) RAMAN SPECTRUM INSPECTION APPARATUS

(71) Applicant: NUCTECH COMPANY LIMITED, Haidian District, Beijing (CN)

(72) Inventors: Jianhong Zhang, Beijing (CN); Hongqiu Wang, Beijing (CN); Li Zhang, Beijing (CN)

(73) Assignee: NUCTECH COMPANY LIMITED, Haidian District, Beijing (CN)

( * ) Notice: Subject to any disclaimer, the term of this patent is extended or adjusted under 35 U.S.C. 154(b) by 0 days.

(21) Appl. No.: 16/043,900

(22) Filed: Jul. 24, 2018

(65) Prior Publication Data

US 2019/0033128 A1    Jan. 31, 2019

(30) Foreign Application Priority Data

Jul. 25, 2017    (CN) .......................... 2017 1 0616652

(51) Int. Cl.
  *G01J 3/44*    (2006.01)
  *G01J 3/02*    (2006.01)
  *G01N 21/65*    (2006.01)
  *G01J 3/10*    (2006.01)

(52) U.S. Cl.
  CPC ............. *G01J 3/0208* (2013.01); *G01J 3/021* (2013.01); *G01J 3/0202* (2013.01); *G01J 3/0227* (2013.01); *G01J 3/0229* (2013.01); *G01J 3/10* (2013.01); *G01J 3/44* (2013.01); *G01N 21/65* (2013.01); *G01J 2003/4424* (2013.01)

(58) Field of Classification Search
  CPC ........ G01J 3/0208; G01J 3/0202; G01J 3/021; G01J 3/0227; G01J 3/0229; G01J 3/10; G01J 3/44; G01J 2003/4424; G01N 21/65
  USPC ........................................................... 356/301
  See application file for complete search history.

(56) References Cited

U.S. PATENT DOCUMENTS

| 3,469,920 | A | * | 9/1969 | Boris | ........................ | G01J 3/44 250/341.1 |
| 3,556,659 | A | * | 1/1971 | Hawes | .................... | G01N 21/65 356/246 |
| 4,505,586 | A | * | 3/1985 | Tochigi | .................. | G01N 21/65 356/301 |
| 4,856,897 | A | * | 8/1989 | Fateley | ................. | G01J 3/2846 356/301 |
| 5,206,699 | A | * | 4/1993 | Stewart | ................. | B07C 5/3425 209/577 |
| 8,823,931 | B1 | * | 9/2014 | Block | .................. | G01J 3/2803 356/301 |

(Continued)

*Primary Examiner* — Tarifur R Chowdhury
*Assistant Examiner* — Jonathon Cook
(74) *Attorney, Agent, or Firm* — Merchant & Gould P.C.

(57) ABSTRACT

A Raman spectrum inspection apparatus is provided, including: a exciting light source configured to emit an exciting light to a sample to be inspected; an optical device configured to collect an optical signal from a position, which is irradiated by the exciting light, of the sample to be inspected; and a spectrometer configured to generate a Raman spectrum of the sample to be inspected from the received optical signal, wherein an excitation optical path in which the exciting light passes from the exciting light device to the sample to be inspected and a detection optical path in which the optical signal received by the spectrometer passes from the sample to be inspected to the spectrometer are separated from each other.

8 Claims, 8 Drawing Sheets

(56) References Cited

U.S. PATENT DOCUMENTS

| | | | |
|---|---|---|---|
| 2004/0063214 A1* | 4/2004 | Berlin | G01N 21/65 436/94 |
| 2004/0142484 A1* | 7/2004 | Berlin | G01N 21/65 436/171 |
| 2011/0112385 A1* | 5/2011 | Aalders | A61B 5/0059 600/322 |
| 2012/0203114 A1* | 8/2012 | Bechtel | A61B 5/0075 600/476 |
| 2015/0204789 A1* | 7/2015 | Akkus | G01N 21/65 702/196 |
| 2017/0176338 A1* | 6/2017 | Wu | G06T 7/90 |

* cited by examiner

RAMAN SPECTRUM INSPECTION APPARATUS

CROSS-REFERENCE TO RELATED APPLICATION

This application claims the priority benefit of Chinese Patent Application No. 201710616652.1 filed on Jul. 25, 2017 in the State Intellectual Property Office of China, the disclosure of which is incorporated herein by reference in entirety.

BACKGROUND

Technical Field

Embodiments of the disclosure relate to the technical field of Raman spectrum inspection, and in particular to a Raman spectrum inspection apparatus.

Description of Related Art

Raman spectrum analysis technology is a non-contact spectrum analysis technology based on Raman scattering effect, which can qualitatively and quantitatively analyse the composition of a substance. Raman spectrum is a molecular vibration spectrum that can reflect the fingerprint characteristics of molecules, and can be used for the inspection of substance. Since the difference between a wave number of Raman spectrum and a wave number of the incident light is independent of a light source, but is determined only by the scattering object (i.e., object to be inspected), the Raman spectrometer can inspect and identify the substance by the Raman spectrum generated by the Raman effect of the object to be inspected for an exciting light. Raman spectrum inspection methods have been widely used in the fields of liquid security inspection, gem identification, explosive inspection, drug inspection, medicine inspection, etc.

In recent years, Raman spectrum analysis technology has been widely used in the fields of dangerous goods inspection and substance identification. In the field of substance identification, because the colours and shapes of various substances are different from each other, it is usually hard for a person to accurately determine the properties of the substance, and a Raman spectrum is determined by the molecular energy level structure of the object to be inspected, and thus a Raman spectrum can be used as the "fingerprint" information of a substance for substance identification. Therefore, Raman spectrum analysis technology has been widely used in the fields of customs, public safety, food & medicine, environment, etc.

In prior Raman spectrum inspection apparatus, an optical path for the exciting light and an detection optical path are often coincident. In order to make the exciting light that is reflected or scattered by the object to be inspected not affect the inspection of the Raman spectrum (signal light), dichroic mirrors are often used for beam-splitting. The dichroic mirror exhibits high reflectivity to the exciting light, while exhibiting high transmissivity to the Raman scattering signal light. However, in practice, the conventional Raman spectrum inspection apparatus having the dichroic mirror is not satisfied for detection of weak Raman signal.

SUMMARY

An embodiment provides a Raman spectrum inspection apparatus, including:

an exciting light source configured to emit an exciting light to a sample to be inspected;

an optical device configured to collect an optical signal from a position, which is irradiated by the exciting light, of the sample to be inspected; and a spectrometer configured to generate a Raman spectrum of the sample to be inspected from a received optical signal, wherein an excitation optical path in which the exciting light passes from the exciting light source to the sample to be inspected and a detection optical path in which the optical signal received by the spectrometer passes from the sample to be inspected to the spectrometer are separated from each other.

In an embodiment, the excitation optical path in which the exciting light passes from the exciting light source to the sample to be inspected offsets by a predetermined angle relative to the detection optical path in which the optical signal received by the spectrometer passes from the sample to be inspected to the spectrometer.

In an embodiment, the predetermined angle is between 15 degrees and 90 degrees.

In an embodiment, the predetermined angle is between 20 degrees and 60 degrees.

In an embodiment, the optical device includes:

a first lens configured to collect the optical signal from the position, which is irradiated by the exciting light, of the sample to be inspected; and a filter configured to filter out the exciting light from the optical signal having passed through the first lens.

In an embodiment, the predetermined angle is set such that the exciting light is kept away from the first lens.

In an embodiment, a second lens is provided in the excitation optical path in which the exciting light passes from the exciting light source to the sample to be inspected, and the second lens is configured to focus the exciting light on the sample to be inspected.

In an embodiment, the optical device includes:

a first lens configured to collect the optical signal from the position, which is irradiated by the exciting light, of the sample to be inspected; and a filter configured to filter out the exciting light from the optical signal having passed through the first lens, wherein the exciting light passes through the first lens and is focused by the first lens to the sample to be inspected.

In an embodiment, a mirror is set in the excitation optical path, and the mirror is configured to guide the exciting light to the first lens.

In an embodiment, the first lens is an aspheric lens.

In an embodiment, a diameter of the first lens is greater than sum of a beam diameter of the exciting light and a beam diameter of the optical signal delivered to the spectrometer from an excitation position.

In an embodiment, the optical device includes:

a first lens configured to collect the optical signal from the position, which is irradiated by the exciting light, of the sample to be inspected; and a filter configured to filter out the exciting light from the optical signal having passed the first lens;

wherein the exciting light passes through the first lens and is focused by the first lens to the sample to be inspected; and the exciting light and a part of the optical signal from the position, which is irradiated by the exciting light, of the sample to be inspected are separated from each other.

In an embodiment, a reflective component is provided in the excitation optical path, and the reflective component is provided between the first lens and the filter, and is configured to guide the exciting light to the first lens and only partially block the optical signal from the position, which is irradiated by the exciting light, of the sample to be inspected.

In an embodiment, a projection area of a reflective surface of the reflective component on the first lens is smaller than area of the first lens.

In an embodiment, the reflective component has a reflective region for reflecting the exciting light, and a light transmission hole allowing a part of the optical signal from the position, which is irradiated by the exciting light, of the sample to be inspected to pass through.

In an embodiment, the optical device further includes:

a third lens configured to focus and transmit the optical signal having passed through the filter to the spectrometer.

In an embodiment, the filter is a long-pass filter or a notch filter.

BRIEF DESCRIPTION OF THE DRAWINGS

For a better understanding of the disclosure, embodiments of the disclosure will be described according to the following figures.

The figures do not show all of the circuits or structures in the Raman spectrum inspection apparatus according to embodiments of the disclosure. The same reference numerals denote the same or similar components or features throughout the drawings.

DETAILED DESCRIPTION OF EMBODIMENTS

Technical solution of the disclosure will be further described in detail by way of embodiments with reference to the accompanying drawings. In the description, the same or similar reference numerals denote the same or similar components. The following description of embodiments of the disclosure with reference to the drawings is intended to explain the general inventive concept of the disclosure, and should not be construed as a limitation of the disclosure.

According to the general concept of the disclosure, it provides a Raman spectrum inspection apparatus including: an exciting light source configured to emit an exciting light to a sample to be inspected; an optical device configured to collect an optical signal from a position, which is irradiated by the exciting light, of the sample to be inspected; and a spectrometer configured to generate a Raman spectrum of the sample to be inspected from the received optical signal, wherein an optical path in which the exciting light passes from the exciting light source to the sample to be inspected (called as an excitation optical path) and an optical path in which the optical signal received by the spectrometer passes from the sample to be inspected to the spectrspectrometer-ometer (called as a detection optical path) are separated from each other. As an example, the excitation optical path is adjacent to the detection optical path.

Additionally, in the following detailed description, for ease of explanation, many specific details are set forth in order to provide a thorough understanding of the disclosed embodiments. However, it will be apparent that one or more embodiments may also be practiced without these specific details. In other instances, well-known structures and devices are shown in the drawings to simplify the drawings.

Figure 1:
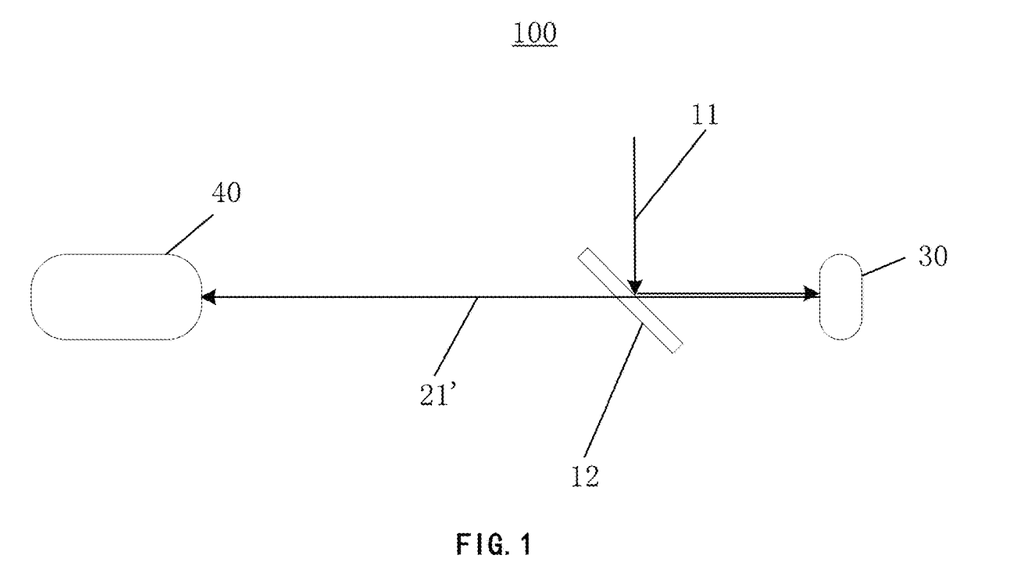
FIG. 1 shows a structural diagram of a conventional Raman spectrum inspection apparatus having a dichroic mirror.

FIG. 1 shows a structural diagram of a conventional Raman spectrum inspection apparatus 100. A dichroic mirror 12 is provided in the Raman spectrum inspection apparatus 100. The dichroic mirror 12 exhibits high reflectivity for an exciting light 11, while exhibiting high transmissivity for a Raman scattering signal light 21'. The dichroic mirror 12 is inclined with respect to both the excitation optical path and the detection optical path. Thus, the exciting light 11 may be reflected by the dichroic mirror 12 to a sample 30 to be inspected, and the Raman scattering signal light 21' from the sample 30 to be inspected may be directed through the dichroic mirror 12 toward a spectrometer 40.

Figure 2:
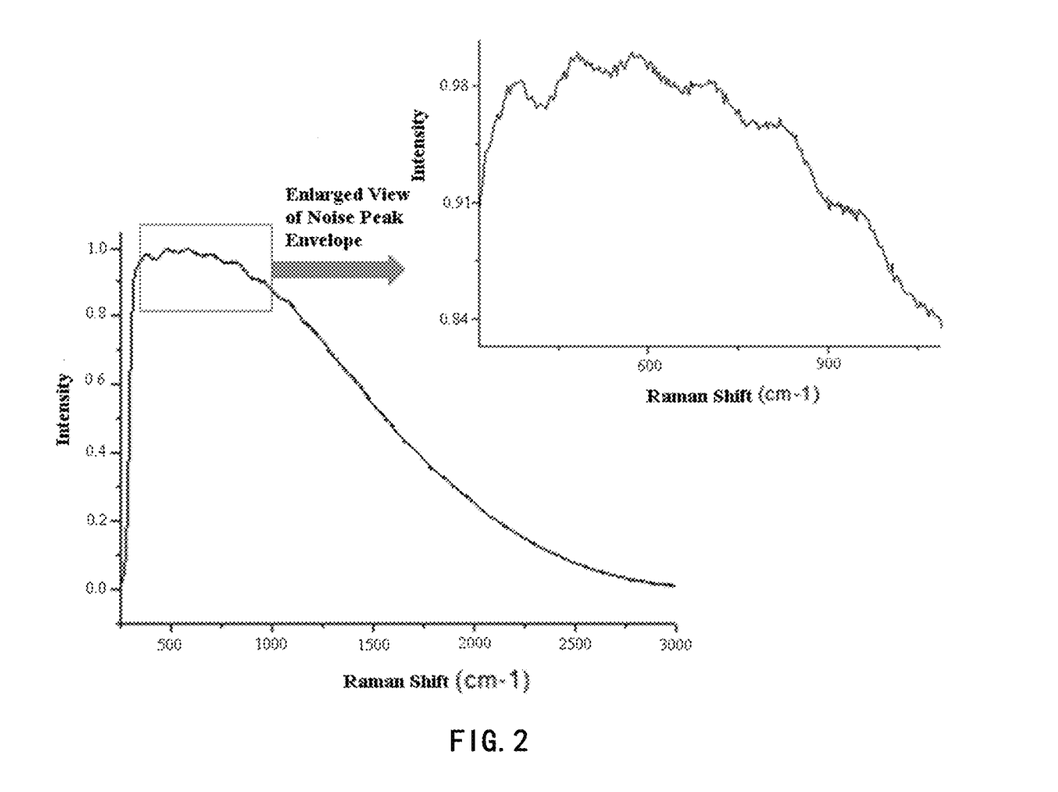
FIG. 2 shows a schematic diagram of a Raman spectrum having noise peak envelope obtained using the Raman spectrum inspection apparatus as shown in FIG. 1.

Since the sample to be inspected is excited by the exciting light, not only the Raman scattering light will be emitted, but also fluorescence will be excited out. Therefore, in order to obtain a pure Raman signal, it needs to subtract a fluorescence signal from the obtained signal through a process such as baseline correction at the final spectrometer. However, when the fluorescence of the sample is strong, there will be a "noise peak envelope", that is, there is a relatively large amplitude of spike noise in the Raman spectral signal, as shown in FIG. 2 (the intensity of the vertical ordinate in FIG. 2 indicates normalized values). However, these noise peak envelopes cannot be removed by baseline correction. Therefore, the Raman scattering optical signal is likely to be impure. Finally, the measured signal will include these spike noises of the fluorescence, which will result in erroneous substance inspection. After long-term studies by the inventors of the present application, it has been found that the occurrence of these noise peak envelopes is greatly associated with the dichroic mirror in the Raman spectrum inspection apparatus. For this reason, in the embodiments of the disclosure, a Raman spectrum inspection apparatus that does not include a dichroic mirror is provided.

Figure 3:
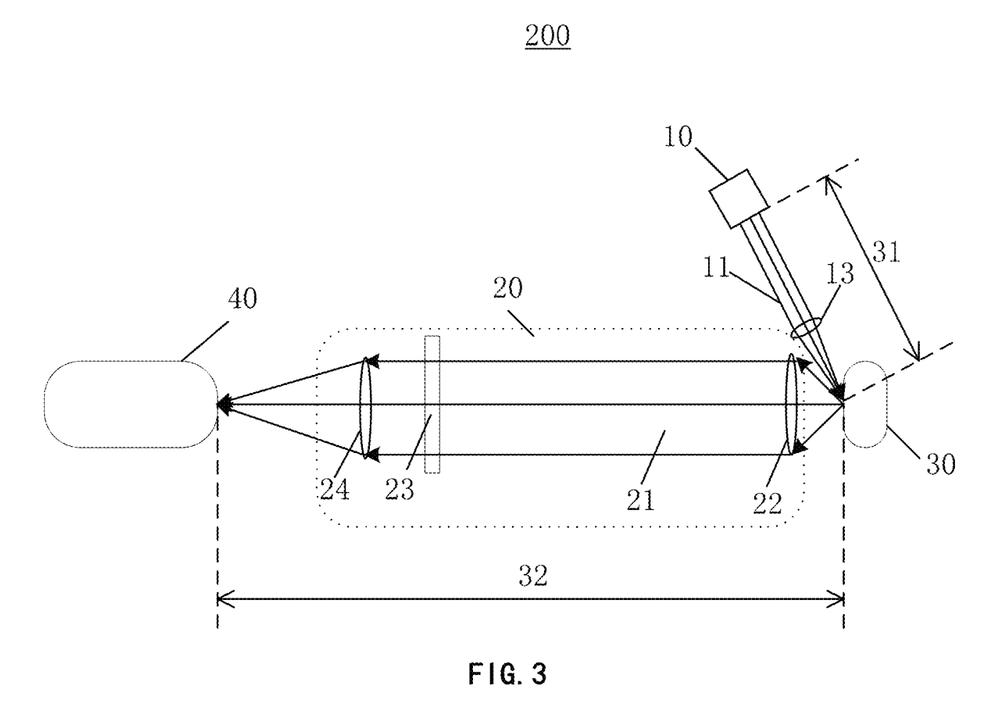
FIG. 3 shows a structural diagram of a Raman spectrum inspection apparatus according to an embodiment of the disclosure.

FIG. 3 shows a Raman spectrum inspection apparatus 200 according to an embodiment of the disclosure. The Raman spectrum inspection apparatus 200 includes: an exciting light source (for example a laser device) 10 configured to emit the exciting light 11 to the sample 30 to be inspected; an optical device 20 configured to collect an optical signal 21 from a position, which is irradiated by the exciting light 11, of the sample 30 to be inspected; and a spectrometer 40 configured to generate a Raman spectrum of the sample 30 to be inspected from the received optical signal. In this embodiment, an optical path 31 in which the exciting light 11 passes from the exciting light device 20 to the sample 30 to be inspected and an optical path 32 passed through by the optical signal 21 received by the spectrometer 40 from the sample 30 to be inspected to the spectrometer 40 are separated from each other. In this embodiment, since the optical path 31 of the exciting light 11 is separated from the optical path 32 of the optical signal 21, the dichroic mirror 12 in the Raman spectrum inspection apparatus 200 can be omitted.

Figure 7A:
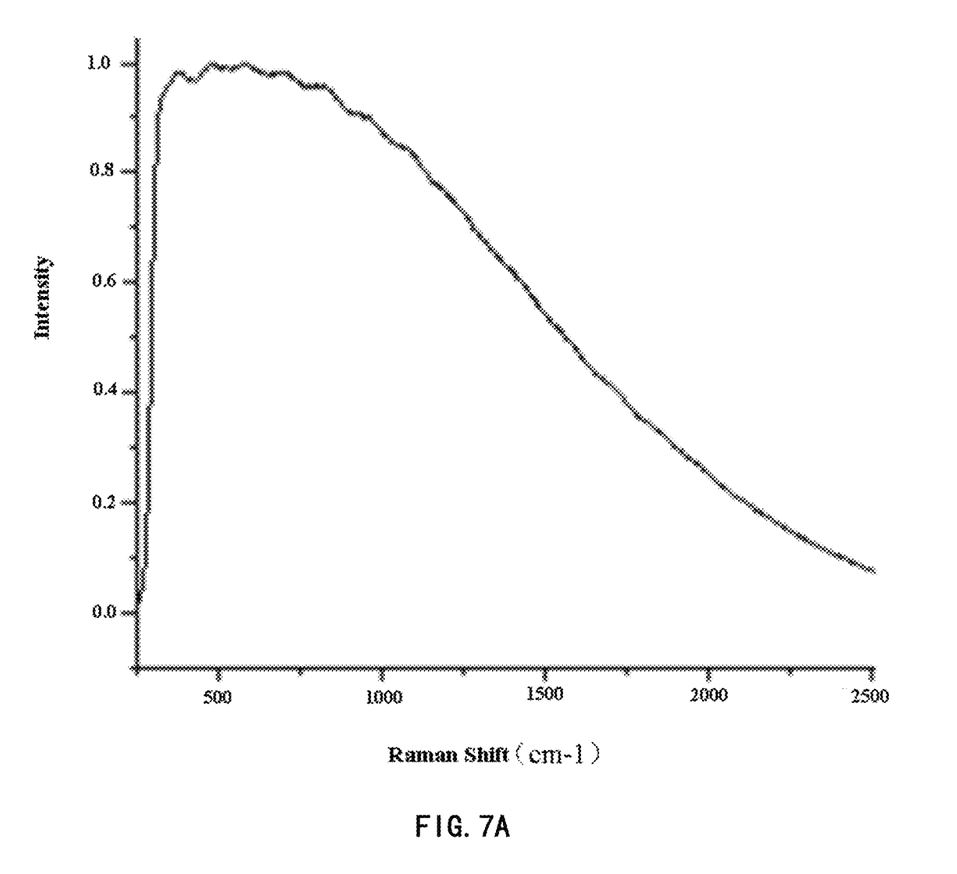
FIG. 7A and FIG. 7B show an inhibitory effect of the Raman spectrum inspection apparatus according to embodiments of the disclosure on noise peak envelope by comparison.
Figure 7B:
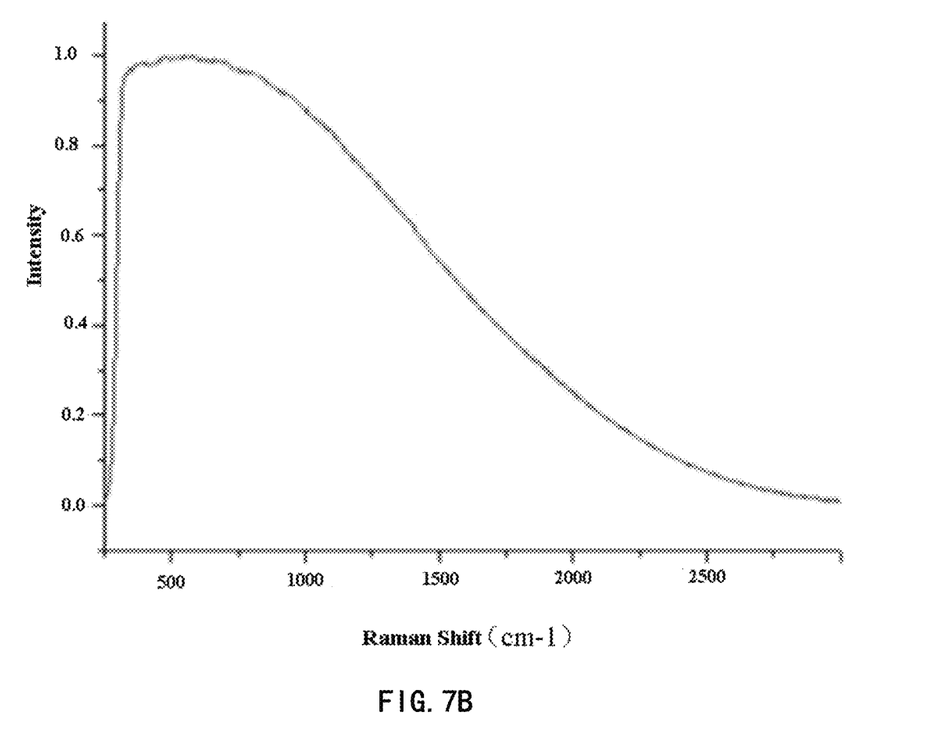
Figure 8A:
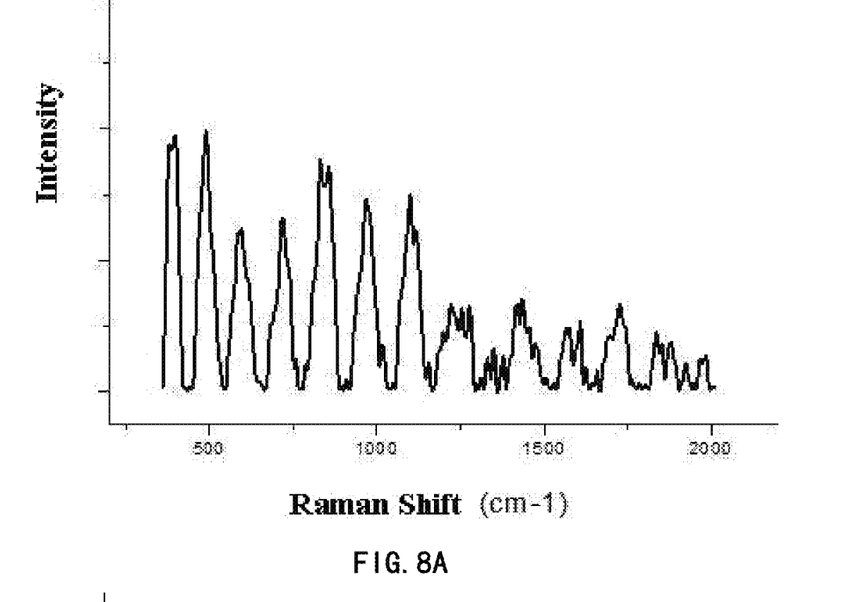
FIG. 8A and FIG. 8B in enlarged view show an inhibitory effect of the Raman spectrum inspection apparatus according to embodiments of the disclosure on noise peak envelope by comparison.
Figure 8B:
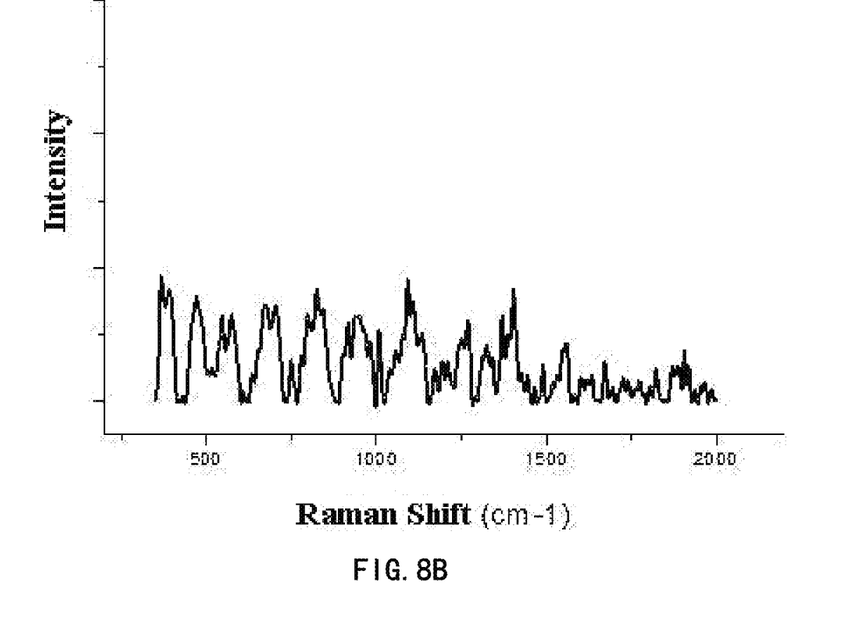

With the above-mentioned Raman spectrum inspection apparatus 200 that does not include a dichroic mirror, the spike noise of the fluorescence in the Raman spectral signal described above can be effectively suppressed. FIG. 7A shows the noise peak envelope in the Raman spectral signal obtained by a Raman spectrum inspection apparatus using a dichroic mirror 12. FIG. 7B shows the effect of the above-mentioned Raman spectrum inspection apparatus according to the embodiments of the present disclosure suppressing the noise peak envelope. From the comparison of FIG. 7A and FIG. 7B, it can be seen that the Raman spectrum inspection apparatus 200 according to the embodiments of the present disclosure can significantly suppress the noise peak envelope. In order to show the effect of suppressing the noise peak envelope more clearly, FIG. 8A and FIG. 8B are provided. FIG. 8A shows a locally enlarged view of the spectral signal obtained by the Raman spectrum inspection apparatus having the dichroic mirror 12. FIG. 8B shows a locally enlarged view of the spectral signal obtained by the above Raman spectrum inspection apparatus 200 that does not include the dichroic mirror. The signals shown in FIG. 8A and FIG. 8B are those that have been processed by such as baseline correction and removal of random noises. Such two data processing methods will be explained at the last paragraphs of the present description. From FIG. 8A, it can be seen that spike noises with large amplitudes may be observed in the left part in FIG. 8A after the baseline correction (removing the baseline) has been applied to the signal. The inventors have found these are noise interference caused by the dichroic mirror. If Raman characteristic peaks in the detection signal are relatively weak, the amplitudes of the characteristic peaks may be comparable to those of the spike pulses shown in the left part in FIG. 8A or even less than those of the spike pulses shown in the left part in FIG. 8A, and thus errors will occur in inspection. In contrast, from the spectrum signal after the baseline correction (removing the baseline) FIG. 8B, it can be seen that the Raman spectrum inspection apparatus 200 that does not include the dichroic mirror can effectively suppress the spike noises of fluorescence (i.e., "noise peak envelope"), for example, a noise variance of the Raman spectral signal can be reduced to a low value of about 0.2.

As described above, the use of a Raman spectrum inspection apparatus 200 that does not include a dichroic mirror may significantly reduce the noise peak envelope, which is significant for Raman inspection of weak signals. When the sample to be inspected has strong fluorescence signal and weak Raman signal, if a Raman spectrum inspection apparatus including a dichroic mirror is used for inspection, the Raman optical signal is likely to be submerged in the noise peak envelope and treated as noise. In contrast, after eliminating an influence of the dichroic mirror, the probability of Raman signal to be extracted will increase greatly, thereby improving the ability of detecting weak Raman signal with fluorescence interference.

As an example, as shown in FIG. 3, in the Raman spectrum inspection apparatus 200, the optical path 31 (hereinafter referred to as an excitation optical path) in which the exciting light 11 travels from the exciting light source 10 to a sample 30 to be inspected offsets by a predetermined angle relative to the optical path 32 (hereinafter referred to as a detection optical path) in which optical signal 21 received by the spectrometer 40 travels from the sample 30 to be inspected to the spectrometer 40. In this way, the excitation optical path and the detection optical path can be separated from each other, and the irradiation position (or referred to as excitation position) of the exciting light 11 on the sample 30 to be inspected can be kept substantially the same as the position of the optical signal 21 collected by the optical device 20, thereby avoiding using a dichroic mirror.

Regarding the predetermined angle by which the excitation optical path offsets with respect to the detection optical path, the inventors have developed it thoroughly. On one hand, in order to make the area on which the exciting light is focused in coincidence with the focusing area of the first lens 22 for collecting the signal light as possible, the predetermined angle is as small as possible while separating the two optical paths (the excitation optical path and the detection optical path) from each other and preventing their mounts from being interfered with each other; on the other hand, the first lens 22 for collecting the signal light should have an enough large diameter to collect sufficient signal light, however, the predetermined angle between the detection optical path and the excitation optical path will increase as the diameter of the first lens 22 increases. Thus, a balance between the above two aspects is desired. In an embodiment, the predetermined angle may be between 15 degrees and 90 degrees, such as between 20 degrees and 60 degrees. The predetermined angle can prevent the excitation optical path and the detection optical path from being disturbed by each other.

In an embodiment, the optical device 200 may include a first lens 22 and a filter 23. The first lens 22 may be configured to collect the optical signal 21 from a position (hereinafter referred to as excitation position), which is irradiated by the exciting light 11, of the sample 30 to be inspected. As an example, the first lens 22 can collimate the optical signal 21 to some extent. The filter 23 may be configured to filter out the exciting light from the optical signal passed through the first lens 22. The filter 23 can fully realize the long-pass filtering function of a dichroic mirror, and can avoid the noise peak envelope caused by the dichroic mirror.

As an example, a second lens 13 may be provided in the excitation optical path, and the second lens 13 is configured to focus the exciting light 11 onto the sample 30 to be inspected. However, the second lens 13 is not always necessary, for example, the exciting light 11 may also directly illuminate the sample 30 to be inspected without being focused by the lens.

As an example, the optical device 20 may further include a third lens 24. The third lens 24 is configured to focus the optical signal 21 having passed through a filter 23 and to direct it to the spectrometer 40. The third lens 24 may help to increase the efficiency of the spectrometer 40 receiving the optical signal.

Figure 4:
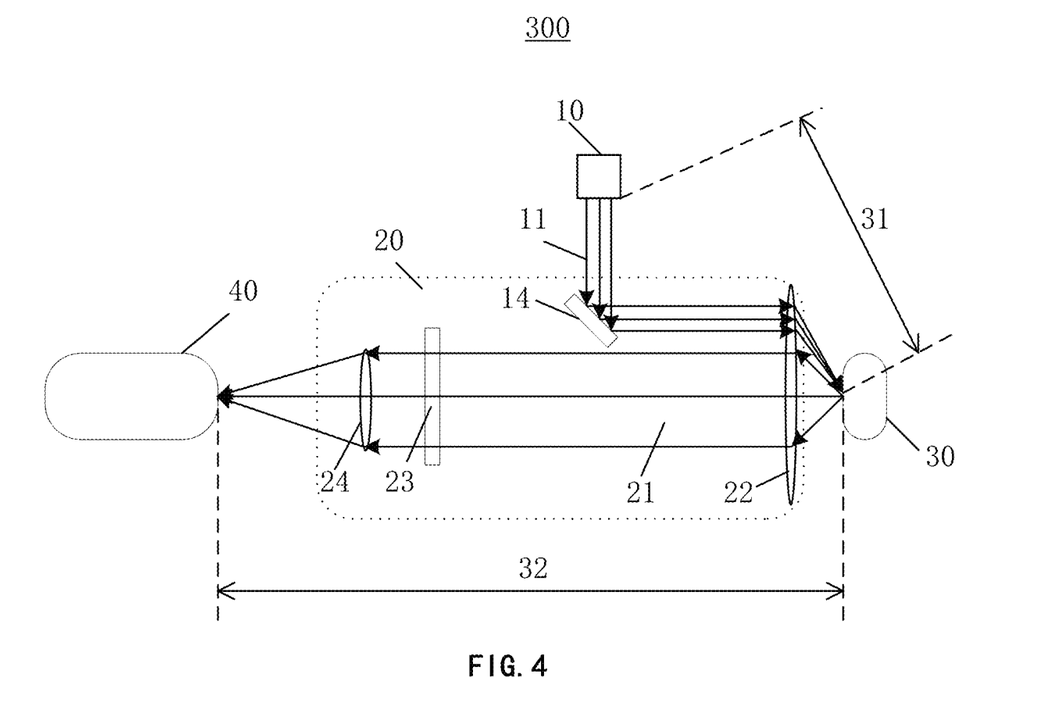
FIG. 4 shows a structural diagram of a Raman spectrum inspection apparatus according to another embodiment of the disclosure.

FIG. 4 shows a structural diagram of a Raman spectrum inspection apparatus according to another embodiment of the disclosure.

In another example, in the Raman spectrum inspection apparatus 300 shown in FIG. 4, the optical device 20 also includes a first lens 22 and a filter 23. The first lens 22 may be configured to collect the optical signal 21 from the position, which is irradiated by the exciting light 11, of the sample 30 to be inspected. The exciting light 11 passes through the first lens 22 and is focused by the first lens 22 onto the sample 30 to be inspected, while the exciting light 11 and the optical signal 21 which is directed to the spectrometer 40 from the excitation position of the sample 30 to be inspected are separated from each other, e.g., in space. In this example, it is also possible to avoid using the dichroic mirror. For example, a first lens 22 having a relatively large diameter may be selected to be sufficient to collect the optical signal 21 on a region of the lens while converging the exciting light 11 on another region. Such two regions are separated from each other. As an example, since a beam diameter of the exciting light 11 is usually smaller than a beam diameter of the optical signal 21 from the excitation position, the exciting light 11 can be guided onto the region of the first lens 22 near its periphery, while leaving a large region to collect the optical signal 21. As an example, the diameter of the first lens 22 may be arranged to be greater than sum of the beam diameter of the exciting light 11 and the beam diameter of the optical signal 21 received by the spectrometer 40 from the excitation position. In this way, the excitation optical path and the detection optical path both pass through the first lens 22 without intersecting each other.

In the above example, the lens for converging the exciting light 11 and the lens for collecting the optical signal 21 is the same lens, thus the excitation position of the exciting light 11 on the sample 30 to be inspected can be easily adjusted to a focal point of the first lens 22. Collecting the optical signal 21 from the focal point of the first lens 22 helps to increase the collection efficiency, which can significantly increase the intensity of the collected optical signal 21. The first lens 22 can collimate the optical signal 21 from the excitation position at its focal point into approximately parallel light beams, which also facilitates the transmission of the optical signal 21.

In an example, in order to guide the exciting light directionally to a suitable region of the first lens 22, a mirror 14 may be provided in the excitation optical path. The mirror 14 is configured to guide the exciting light 11 to the first lens 22.

As an example, the first lens 22 may be an aspheric lens, which helps to avoid distortion of the optical path, especially for the first lens 22 with a large diameter. Since different regions of the first lens 22 are respectively used for converging the exciting light 11 and collecting the optical signal 21, it is also very advantageous to prevent the distortion of the optical paths.

Figure 5:
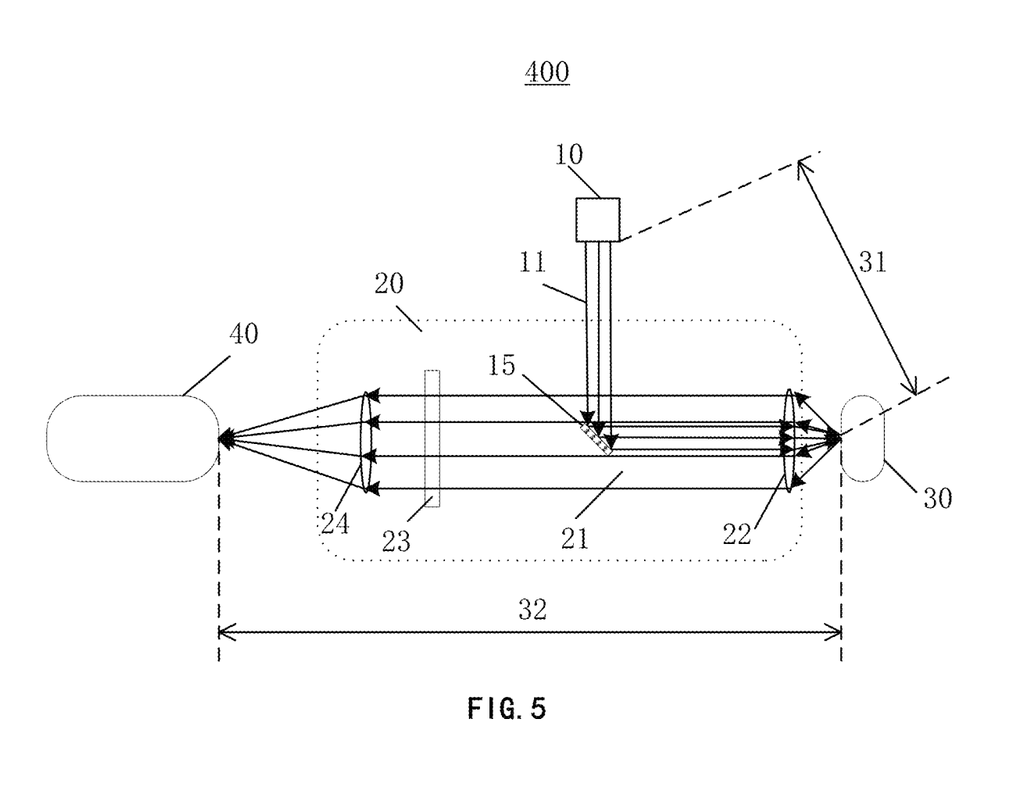
FIG. 5 shows a structural diagram of a Raman spectrum inspection apparatus according to still another embodiment of the disclosure.

FIG. 5 shows a structural diagram of a Raman spectrum inspection apparatus according to still another embodiment of the disclosure.

In another example, in the Raman spectrum inspection apparatus 400 shown in FIG. 5, the optical device 20 also includes the first lens 22 and the filter 23. The first lens 22 may be configured to collect the optical signal 21 from a position, which is irradiated by the exciting light 11, of the sample 30 to be inspected. The exciting light 11 passes through the first lens 22 and is focused by the first lens 22 onto the sample 30 to be inspected. And the exciting light 11 and a part of the optical signal 21 from an excitation position of the sample 30 to be inspected are separated from each other. In this example, the exciting light 11 is separated from only a part (but not all) of the optical signal 21, while another part of the optical signal 21 not separated from the exciting light 11 may be unable to reach the spectrometer. This means that a part of the optical signal 21 from the excitation position can be appropriately sacrificed to avoid the use of a dichroic mirror.

In this example, the lens for converging the exciting light 11 and the lens for collecting the optical signal 21 is the same lens. Therefore, the excitation position of the exciting light 11 on the sample 30 to be inspected can be easily adjusted to a focal point of the first lens 22. Collecting the optical signal 21 from the focal point of the first lens 22 helps to increase the collection efficiency, which can also significantly increase the intensity of the collected optical signal 21, and which can also collimate the optical signal 21 from the excitation position at the focal point into approximately parallel light beams. Furthermore, since the exciting light 11 is not necessary to be separated from all of parts of the optical signal 21 having passed through the first lens 22, this can make the spatial arrangement more compact.

As an example, a reflective component 15 may be provided in the excitation optical path. The reflective component 15 may be provided between the first lens 22 and the filter 23, and configured to guide the exciting light 11 to the first lens 22 and to only partially block the optical signal 21 from the excitation position of the sample 30 to be inspected. In this example, the reflective component 15 is provided not only in the optical path of the exciting light 11, but also in the optical path of the optical device 20. However, the optical path 31 in which the exciting light 11 passes from the exciting light source 10 to the sample 30 to be inspected and the optical path 32 in which the optical signal 21 received by the spectrometer 40 passes from the sample 30 to be inspected to the spectrometer 40 are still separated from each other, because the part of the optical signal 21 that is not separated from the exciting light 11 is blocked by the reflective component 15 rather than received by the spectrometer 40. The optical path 32 in which the part of the optical signal 21 received by the spectrometer 40 passes from the sample 30 to be inspected to the spectroscope 40 is still separated from the excitation optical path. In the example of FIG. 5, the reflective component 15 blocks a middle part of the optical signal 21 collected by the first lens 22, and the blocked part of the optical signal will not reach the spectrometer 40. However, the part of optical signal surrounding the reflective component 15 is not blocked by the reflective component 15, and can still be directed to the spectrometer 40. The optical path in which the optical signal that finally reaches the spectrometer 40 is still separated from the excitation optical path.

As an example, a projection area of a reflective surface of the reflective component 15 on the first lens 22 may be smaller than an area of the first lens 22, and may be, for example, 50%, 30%, 10%, or less of the area of the first lens 22, such as 20% to 40% of the area of the first lens 22. This may ensure that the reflective component 15 does not block all of parts of the optical signal 21 collected by the first lens 22. In general, reduction of the projection area of the reflective surface of the reflective component 15 on the first lens 22 facilitates increasing the intensity of the optical signal reaching the spectrometer 40. However, the diameter of the reflective component 15 cannot be too small to provide sufficient exciting light 11 reflected to the sample 30 for the Raman inspection. As an example, the reflective component 15 can guide the exciting light 11 toward the first lens 22 along an axis of the first lens 22. The portion of the reflective component 15 for reflecting the exciting light 11 is for example located on the axis of the first lens 22. However, the embodiments of the present disclosure are not limited to this.

Figure 6:
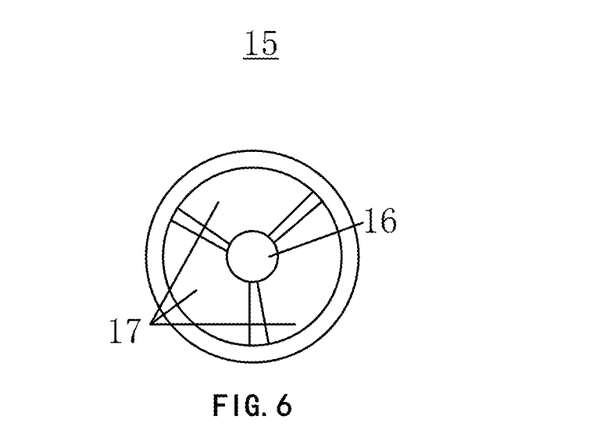
FIG. 6 shows a reflective component in a Raman spectrum inspection apparatus according to an embodiment of the disclosure.

In an example, the reflective component 15 may be a physical mirror, as shown in FIG. 5. Alternatively, it may have other forms as well. For example, as shown in FIG. 6, the reflective component 15 may have: a reflective region 16 for reflecting the exciting light 11; and a light transmission hole 17 allowing a part of the optical signal 21 from the excitation position of the sample 30 to be inspected to pass through. As an example, the reflective region 16 may be located in a central portion of the reflective component 15, while the light transmission hole 17 may be located radially outside the reflective region 16. In this circumstance, the area of the reflective region 16 may also meet the above mentioned ratio. Such structure is more conducive to adjusting and fixing the reflective component 15. The overall shape of the reflective component 15 may be any shape such as a circle, a rectangle, a square, a hexagon, etc.

As an example, the optical device 20 may further include a third lens 24 configured to focus and deliver the optical signal 21, which has passed through the filter 23, to the spectrometer 40. The third lens 24 helps to increase the efficiency of the spectroscope 40 for receiving the optical signal.

As an example, the filter 23 may be a long-pass filter or a notch filter. It can effectively filter out Rayleigh scattering light. The optical signal 21 collected by the first lens 22 often includes not only the Raman optical signal 21, but also Rayleigh light, fluorescence, etc. The exciting light has a shorter wavelength than Raman light, and thus can be removed using a long-pass filter or notch filter. A cut-off wavelength of the long-pass filter or the notch filter can be set according to actual requirements. For example, when the Raman spectrum processed by the spectrometer in the Raman spectrum inspection apparatus has a wavelength range of 550 to 1100 nm, the cut-off wavelength can be set to allow light in the wavelength range to pass through.

Additionally, in order to remove the interference in the optical signal 21, the spectrum data obtained by the Raman spectrum inspection apparatus can further be subject to processes of random noise removal and baseline correction so as to reduce the influence of noise. Random noise removal removes the random noise contained in the spectrum. Common methods include, but are not limited to: moving window average smoothing, polynomial moving average filtering, and the like. Additionally, before the analysis of the spectrum, it is possible to inhibit the fluorescence background to some extent. Baseline correction is used to remove the fluorescence signal in the signal light, thereby obtaining a relatively pure Raman signal. Common methods include, but are not limited to: polynomial fitting, wavelet transform techniques, Fourier transform techniques, and the like. The processing of signals is not limited to the above two ways.

According to the Raman spectrum inspection apparatus of embodiments of the disclosure, with the separation design of the excitation optical path and the detection optical path, it avoids the use of a dichroic mirror, suppresses the noise peak envelope caused by the dichroic mirror, and improves the inspection accuracy of the Raman signal, especially improves the ability to resist the interference of fluorescence.

Unless there are technical obstacles or contradictions, the above various embodiments of the disclosure can be freely combined to form additional embodiments. These other embodiments all fall within the protection scope of the disclosure.

Although the disclosure has been described in conjunction with the drawings, the embodiments disclosed in the drawings are intended to illustrate the exemplified embodiments of the disclosure and cannot be construed as a limitation of the disclosure. The dimensional proportions in the drawings are merely schematic, and are not to be construed as limiting the disclosure.

Although some embodiments of the disclosure have been shown and described, those of ordinary skill in the art will understand that modification may be made to these embodiments without departing from the principles and spirit of the present general inventive concept. The scope is defined by the claims and their equivalents.

What is claimed is:

1. A Raman spectrum inspection apparatus, comprising:
an exciting light source configured to emit an exciting light to a sample to be inspected;
an optical device configured to collect an optical signal from a position, which is irradiated by the exciting light, of the sample to be inspected; and
a spectrometer configured to generate a Raman spectrum of the sample to be inspected from a received optical signal,
wherein entirety of an excitation optical path in which the exciting light passes from the exciting light source to the sample and entirety of a detection optical path in which the optical signal received by the spectrometer passes from the sample to the spectrometer are separated from each other,
wherein the optical device comprises:
a first lens configured to collect the optical signal from the position, which is irradiated by the exciting light, of the sample to be inspected; and
a filter configured to filter out the exciting light from the optical signal having passed through the first lens,
wherein the exciting light passes through the first lens and is focused by the first lens to the sample to be inspected;
wherein the first lens comprises a first region configured to pass the exciting light therethrough and a second region configured to collect the optical signal, the first region and the second region are separated from each other in space such that the excitation light and the optical signal are separated from each other in space; and
wherein a diameter of the first lens is greater than sum of a beam diameter of the exciting light and a beam diameter of the optical signal delivered to the spectrometer from an excitation position.

2. The Raman spectrum inspection apparatus of claim 1, wherein a mirror is set in the excitation optical path, and the mirror is configured to guide the exciting light to the first lens.

3. The Raman spectrum inspection apparatus of claim 1, wherein the first lens is an aspheric lens.

4. The Raman spectrum inspection apparatus of claim 1, wherein the optical device further comprises:
a second lens configured to focus and transmit the optical signal having passed through the filter to the spectrometer.

5. The Raman spectrum inspection apparatus of claim 1, wherein the filter is a long-pass filter or a notch filter.

6. A Raman spectrum inspection apparatus, comprising:
an exciting light source configured to emit an exciting light to a sample to be inspected;
an optical device configured to collect an optical signal from a position, which is irradiated by the exciting light, of the sample to be inspected; and
a spectrometer configured to generate a Raman spectrum of the sample to be inspected from a received optical signal,
wherein entirety of an excitation optical path in which the exciting light passes from the exciting light source to the sample and entirety of a detection optical path in which the optical signal received by the spectrometer passes from the sample to the spectrometer are separated from each other, wherein the optical device comprises:
a first lens configured to collect the optical signal from the position, which is irradiated by the exciting light, of the sample to be inspected; and
a filter configured to filter out the exciting light from the optical signal having passed through the first lens;
wherein the exciting light passes through the first lens and is focused by the first lens to the sample to be inspected; and the exciting light and a part of the optical signal from the position, which is irradiated by the exciting light, of the sample to be inspected are separated from each other;
wherein a reflective component is provided in the excitation optical path, and the reflective component is provided between the first lens and the filter, and is configured to guide the exciting light to the first lens and only partially block the optical signal from the position, which is irradiated by the exciting light, of the sample to be inspected, and a projection area of the reflective component on the first lens is smaller than area of the first lens.

7. The Raman spectrum inspection apparatus of claim 6, wherein the reflective component has a reflective region for reflecting the exciting light, and a light transmission hole allowing a part of the optical signal from the position, which is irradiated by the exciting light, of the sample to be inspected to pass through.

8. The Raman spectrum inspection apparatus of claim 6, wherein the optical device further comprises:
a second lens configured to focus and transmit the optical signal having passed through the filter to the spectrometer.

* * * * *